United States Patent Office 3,116,329
Patented Dec. 31, 1963

3,116,329
PROCESS FOR THE PREPARATION OF THIURAMDISULFIDES
Charles M. Hayes, Hoffman Estates, and Alexander Gaydasch, Chicago, Ill., assignors to Universal Oil Products Company, Des Plaines, Ill., a corporation of Delaware
No Drawing. Filed May 11, 1961, Ser. No. 109,252
8 Claims. (Cl. 260—567)

This invention relates in general to a novel process for the preparation of thiuramdisulfides. More particularly, this invention relates to the preparation of tetraalkylthiuramdisulfides.

The thiuramdisulfides to which the process of this invention relates are compounds which have found extensive application, principally as accelerators to improve the vulcanization of synthetic as well as natural rubber compounds, but also as fungicides and insecticides. The compounds referred to are for the most part alkyl derivatives of thiuramdisulfide of which bis(N,N-dimethylthiocarbamyl) disulfide, bis(N,N-diethylthiocarbamyl) disulfide, bis(N,N-diisopropylthiocarbamyl) disulfide, and bis(N,N-dibutylthiocarbamyl) disulfide are among the more important. Bis(N,N-diethylthiocarbamyl) disulfide, for example, may be utilized without additional sulfur as a vulcanizing agent or with sulfur as an ultra accelerator as well as an activator for thiazole type accelerators. Bis(N,N-diethylthiocarbamyl) disulfide also causes vulcanizates to be non-staining non-discoloring, and exceptionally resistant to heat aging.

It is an object of this invention to present a novel one-step process for the preparation of hydrocarbon substituted thiuramdisulfides.

It is a more specific object of this invention to present a novel one-step process for the preparation of bis(N,N-diethylthiocarbamyl disulfide.

In one of its broader aspects this invention embodies a process for the preparation of a thiuramdisulfide which comprises reacting a secondary amine and carbon disulfide and forming said thiuramdisulfide in the presence of an oxidizing agent and a phthalocyanine catalyst.

Another embodiment is in a process for the preparation of a hydrocarbon substituted thiuramdisulfide which comprises reacting a hydrocarbon substituted secondary amine and carbon disulfide and forming said hydrocarbon substituted thiuramidsulfide in the presence of an oxidizing agent and a group VIII metal phthalocyanine catalyst.

A further embodiment is in a process for the preparation of a tetraalkylthiuramidsulfide which comprises reacting a dialkylamine and carbon disulfide and forming said tetraalkylthiuramidsulfide in the presence of an oxidizing agent and an iron group metal phthalocyanine catalyst at a pH of from about 7 to about 12.

A specific embodiment is in a process for the preparation of bis(N,N-diethylthiocarbamyl) disulfide which comprises reacting diethylamine and carbon disulfide and forming said bis(N,N-diethylthiocarbamyl) disulfide in the presence of air and cobalt phthalocyanine disulfonate in an aqueous medium at a pH of from about 7 to about 8.5.

Other objects and embodiments will become apparent in the following detailed description of the process of this invention.

In accordance with the process of the present invention a thiuramdisulfide is prepared by reacting a secondary amine and carbon disulfide and forming said thiuramdisulfide in the presence of an oxidizing agent and a phthalocyanine catalyst.

The secondary amines to which the process of this invention applies are preferably hydrocarbon substituted secondary amines including dialkyl amines, for example, dimethylamine, diethylamine, dipropylamine, diisopropylamine, dibutylamine, di-sec-butylamine, di-tert-butylamine, di(2-methylpropyl)amine, dipentylamine, di(1-methylbutyl)amine, di(2-methylbutyl)amine, di(3-methylbutyl)amine, di(1,1-dimethylpropyl)amine, di(2,2-dimethylpropyl)amine, di(1,2-dimethylpropyl)amine, dihexylamine, di(1-methylpentyl)amine, di(2-methylpentyl)amine, di(3-methylpentyl)amine, di(4-ethylpentyl)amine, di(1,1-dimethylbutyl)amine, di(2,2-dimethylbutyl)amine, di(3,3-dimethylbutyl)amine, di(2,3-dimethylbutyl)amine, di(1-ethylbutyl)amine, di(2-ethylbutyl)amine, diheptylamine, di(1-methylhexyl)amine, di(2-methylhexyl)amine, di(3-methylhexyl)amine, di(4-methylhexyl)amine, di(5-methylhexyl)amine, di(1-ethylpentyl)amine, di(2-ethylpentyl)amine, di(3-ethylpentyl)amine, dioctylamine, di(1-methylheptyl)amine, di(2-methylheptyl)amine, di(3-methylheptyl)amine, di(4-methylheptyl)amine, di(5-methylheptyl)amine, di(6-methylheptyl)amine, di(1-ethylhexyl)amine, di(2-ethylhexyl)amine, di(3-ethylhexyl)amine, di(4-ethylhexyl)amine, etc. Said hydrocarbon substituted secondary amines also include diarylamines such as diphenylamine, 4,4'-dimethyldiphenylamine, 3,3'-dimethyldiphenylamine, 2,2'-dimethyldiphenylamine, and the like, and also alkylarylamines including N-methylaniline, N-ethylaniline, N-propylaniline, N-isopropylaniline, N-butylaniline, N-sec-butylaniline, N-tert-butylaniline, N-pentylaniline, N(1-methylbutyl)aniline, N(2-methylbutyl)aniline, N(3-methylbutyl)aniline, N(1,1-dimethylpropyl)aniline, N(2,2-dimethylpropyl)aniline, N(1,2-dimethylpropyl)aniline, N-hexylaniline, N(1-methylpentyl)aniline, N(2-methylpentyl)aniline, N(3-methylpentyl)aniline, N(4-methylpentyl)aniline, N(1,1-dimethylbutyl)aniline, N(2,2-dimethylbutyl)aniline, N(3,3-dimethylbutyl)aniline, N(2,3-dimethylbutyl)aniline, N(1-ethylbutyl)aniline, N(2-ethylbutyl)aniline, N-heptylaniline, N(1-methylhexyl)aniline, N(2-methylhexyl)aniline, N(3-methylhexyl)aniline, N(4-methylhexyl)aniline, N(5-methylhexyl)aniline, N(1-ethylpentyl)aniline, N(2-ethylpentyl)aniline, N(3-ethylpentyl)aniline, N-octylaniline, N(1-methylheptyl)aniline, N(2-methylheptyl)aniline, N(3-methylheptyl)aniline, N(4-methylheptylaniline, N(5-methylheptyl)aniline, N(6-methylheptyl)aniline, N(1-ethylhexyl)aniline, N(2-ethylhexyl)aniline, N(3-ethylhexyl)aniline, N(4-ethylhexyl)aniline, etc. The hydrocarbon substituents of any particular diarylamine or dialkylamine may be the same as in the representative groups set out above or said hydrocarbon substituents may be different as in the case of methylethylamine, methylpropylamine, methylbutylamine, ethylpropylamine, ethylbutylamine, or 4-methyldiphenylamine, 3-methyldiphenylamine, 2-methyldiphenylamine, and the like.

The aforementioned secondary amines are representative of the dialkyl, diaryl, and alkylaryl secondary amines which can be reacted with carbon disulfide to form the corresponding thiuramdisulfides in the presence of an oxidizing agent and a phthalocyanine catalyst in accordance with the present process although not necessarily with the same or equivalent results. The process of this invention is preferably directed to the reaction of dialkylamines and carbon disulfide to form tetraalkylthiuramdisulfides in the presence of an oxidizing agent and a phthalocyanine catalyst.

In one preferred embodiment of this invention dimethylamine is reacted with carbon disulfide to form bis-(N,N-dimethylthiocarbamyl) disulfide in the presence of an oxidizing agent and a phthalocyanine catalyst.

In another preferred embodiment diethylamine is reacted with carbon disulfide to form bis(N,N-diethylthiocarbamyl) disulfide in the presence of an oxidizing agent and a phthalocyanine catalyst.

In still another preferred embodiment diisopropylamine is reacted with carbon disulfide to form bis(N,N-diisopropylthiocarbamyl) disulfide in the presence of an oxidizing agent and a phthalocyanine catalyst.

In yet another preferred embodiment dibutylamine is reacted with carbon disulfide to form bis(N,N-dibutylthiocarbamyl) disulfide in the presence of an oxidizing agent and a phthalocyanine catalyst.

The present invention is directed towards a one-step process wherein the selected secondary amine is reacted with carbon disulfide and the desired thiuramdisulfide is formed in the presence of an oxidizing agent and a phthalocyanine catalyst in a single operation. Thus, the secondary amine can be reacted with the carbon disulfide with subsequent addition of an oxdizing agent and a phthalocyanine catalyst to the reaction mixture or, preferably, said secondary amine can be reacted with the carbon disulfide in the presence of an oxidizing agent and said phthalocyanine catalyst to form the desired thiuramdisulfide. In either case the result is a one-step process which obviates the need of stabilizing the intermediate dithiocarbamyl product, as with caustic, and isolation thereof prior to formation of the desired thiuramdisulfide as is generally the practice in prior art methods.

While it is contemplated that other oxdizing agents may be utilized it is preferred to utilize oxygen or an oxygen-containing gas, particularly air.

As had been stated, the present process utilizes a phthalocyanine catalyst. Any suitable phthalocyanine catalyst may be utilized, particularly metal phthalocyanine catalysts. Phthalocyanines comprising a Group VIII metal are preferred and include, for example, iron phthalocyanine, cobalt phthalocyanine, nickel phthalocyanine, rhodium phthalocyanine, ruthenium phthalocyanine, palladium phthalocyanine, osmium phthalocyanine, iridium phthalocyanine, and platinum phthalocyanine. Phthalocyanines comprising an iron group metal, i.e. iron phthalocyanine, cobalt phthalocyanine and nickel phthalocyanine, are particularly preferred. The specific phthalocyanines set forth are for illustrative purposes only and it is not intended to limit the process of this invention thereto. It is understood that any suitable phthalocyanine may be employed although not necessarily with the same or equivalent results.

In general, the metal phthalocyanines are not readily soluble in alkaline solutions as herein employed and therefore, for improved operation, it is preferable to utilize a soluble derivative thereof. Particularly suitable derivatives of said metal phthalocyanines are the sulfonated derivatives thereof. The sulfonated derivatives may be prepared in any suitable manner and in some cases are available for purchase in the open market. Sulfonic acid derivatives of the metal phthalocyanines may be prepared in any conventional or suitable manner. For example, the sulfonate of cobalt phthalocyanine may be prepared by reacting cobalt phthalocyanine with 20% fuming sulfuric acid.

While the sulfonic acid derivatives are preferred, it is understood that other suitable derivatives may be employed in accordance with the present invention. For example, the carboxylated derivatives may be utilized. They may be prepared in any suitable manner, for example, by the action by trichloroacetic acid on the metal phthalocyanine or by the action of oxygen and aluminum chloride. In the latter reaction, the acid chloride is formed and may be converted to the desired carboxylated derivatives by conventional hydrolysis methods.

The phthalocyanine catalyst is both very active and highly stable and can be utilized in exceedingly small concentrations which may be from about 5 to about 500 parts per million or more, based on the weight of the particular secondary amine employed. Although higher concentrations can be used, little if any benefit results therefrom. It is preferred to utilize the catalyst in a concentration of from about 10 to about 100 parts per million.

In general, the activity of the phthalocyanine catalyst is enhanced by the utilization of a suitable solubilizing agent. Accordingly, the process of this invention is effected in the presence of a suitable solubilizing agent as, for example, by effecting said process in an aqueous medium, or a non-aqueous medium such as benzene, methanol, ethanol or other suitable solubilizing agent. It is preferred to form the thiuramdisulfide at a pH of from about 7 to about 12, or more preferably at a pH of from about 7 to about 8.5 to obtain optimum yields of the desired thiuramdisulfide. Accordingly, it is preferred to prepare the thiuramdisulfide in an aqueous medium whereby the pH can be controlled within the desired limits. One preferred method of pH control involves the addition of acidic materials to the reaction mixture during the course of the reaction as required. It is preferred to utilize carbon dioxide for this purpose although mineral acids such as hydrochloric acid or sulfuric acid, or organic acids such as acetic acid, may be utilized.

The process of this invention is operable at temperatures of from about 5° C. to about 200° C. although it is preferred to use a temperature of from about 5° C. to about 100° C. In some instances it may be desirable to effect the process of this invention in a sealed vessel in which case air, or other oxygen-containing gas, is charged to the vessel and sealed therein at superatmospheric pressures to insure an adequate supply of said air or other oxygen-containing gas as an oxidizing agent. Otherwise, pressure does not appear to be an important variable with relation to the present process which may be operated at atmospheric, superatmospheric or autogenous pressures as the case may require.

The process of this invention can be effected in any suitable or convenient manner and may comprise a batch or continuous type of operation. The process can be effected batchwise by the addition of air and carbon disulfide to a mixture comprising a secondary amine, a phthalocyanine catalyst, and a solubilizing agent such as water, said mixture being contained in any conventional or suitable reaction vessel. In some cases it may be desirable to maintain the aforesaid mixture at a temperature of from about 5° C. to about 50° C. during the addition of carbon disulfide thereto and thereafter completing the reaction at a temperature in the previously described temperature range. The air and carbon disulfide can in most cases be added either concurrently or alternately during the course of the reaction. A suitable reaction vessel would preferably embody adequate heating means as well as an overhead reflux condenser. It is of course highly desirable in this type of operation that adequate means be provided for agitation of the vessel contents, for example, mechanical stirrers or other suitable mixing devices, to assure constant and intimate contact of the reactants to secure an optimum conversion thereof. The acidic materials utilized to control the pH of the reaction mixture may be added dropwise from a dropping funnel, or, in the case of carbon dioxide, bubbled through the reaction mixture at a suitable rate. In a continuous process, the secondary amine, carbon disulfide, phthalocyanine catalyst, and water can be combined in a single stream and continuously passed through a reaction zone in contact with an ascending stream of air and carbon dioxide. The product which precipitates can be recovered from the reactor effluent by filtration.

The following examples are presented solely for the purpose of illustrating the process of the present invention and it is not intended to thereby unduly limit the generally broad scope thereof.

*Example I*

Bis(N,N-diethylthiocarbamyl) disulfide was prepared in a glass vessel equipped with a mechanical stirrer and an overhead condenser. Approximately 76 grams of carbon disulfide was added dropwise to 73 grams of diethylamine and 50 milligrams of cobalt phthalocyanine disulfonate in 400 cc. of benzene over a 2 hour period during which air was continuously bubbled into and dispersed throughout the resulting reaction mixture. The reaction mixture was heated at about 75° C. during the course of the reaction. At the completion of the 2 hour period the vessel contents were cooled to about room temperature and filtered. Approximately 13 grams of bis(N,N-diethylthiocarbamyl) disulfide was recovered.

*Example II*

In this example bis(N,N-diethylthiocarbamyl) disulfide was prepared by continuously charging air through a reaction mixture comprising about 73 grams of diethylamine, 50 milligrams of cobalt phthalocyaninedisulfonate, 400 cc. of methanol and 76 grams of carbon disulfide, said carbon disulfide being added to the reaction mixture over a 2 hour period. The reaction mixture was maintained at about 55° C. during the course of the reaction. At the completion of the 2 hour period the reaction mixture was cooled to about room temperature and filtered. Approximately 30 grams of bis(N,N-diethylthiocarbamyl) disulfide was recovered.

*Example III*

This example illustrates the preparation of bis(N,N-diethylthiocarbamyl) disulfide at a pH of from about 7 to about 8.5. Carbon disulfide is added dropwise to diethylamine and cobalt phthalocyanine disulfonate in aqueous solution while air is continuously charged to and dispersed throughout said solution. The reaction mixture is maintained at about 75° C. Carbon dioxide in the form of crushed Dry Ice is added to the reaction mixture to maintain the pH in the range of from about 7 to about 8.5. As a result of maintaining the reaction mixture within the aforesaid pH range the yield of bis(N,N-diethylthiocarbamyl) disulfide is increased.

*Example IV*

This is an example of the manner in which bis(N,N-dimethylthiocarbamyl) disulfide is prepared according to the present process. Carbon disulfide is added dropwise to a vigorously stirred aqueous solution of dimethylamine and cobalt phthalocyanine disulfonate located in a reaction vessel comprising a stirring mechanism, a dropping funnel and an overhead condenser while air is continuously charged to and dispersed through said solution. The reaction mixture is maintained at about 5–10° C. during the addition of carbon disulfide thereto. Thereafter the temperature is raised and the reaction completed at a temperature of about 30° C. Carbon dioxide in the form of crushed Dry Ice is added to the reaction mixture to maintain the pH in the range of from about 7 to about 8.5 At the completion of the reaction the product which precipitates during the course of the reaction is recovered by filtration of the vessel contents.

*Example V*

Bis(N,N-diisopropylthiocarbamyl) disulfide is prepared in substantially the same manner as in the foregoing example but at a higher temperature and utilizing diisopropylamine. Accordingly, carbon disulfide is added dropwise to diisopropylamine, cobalt phthalocyanine, and water located in a reaction vessel comprising a stirring mechanism, a dropping funnel, and an overhead condenser while air is continuously charged to and dispersed throughout the resulting reaction mixture. The reaction mixture is maintained at about 80–85° C. Carbon dioxide in the form of crushed Dry Ice is added to the reaction mixture to maintain the pH in the desired range of from about 7 to about 8.5. The product is recovered at the end of the reaction period by filtration of a vessel contents.

*Example VI*

Bis(N,N-dibutylthiocarbamyl) disulfide is prepared in substantially the same manner as set out in Example III but at a higher temperature and utilizing dibutylamine. Accordingly, carbon disulfide is added dropwise to a vigorously stirred aqueous solution of dibutylamine and cobalt phthalocyanine located in a reaction vessel comprising a stirring mechanism, a dropping funnel, and an overhead condenser while air is continuously charged to and dispersed throughout said solution. The reaction mixture in this case is maintained at about 90–100° C. Carbon dioxide in the form of crushed Dry Ice is added to the reaction mixture to maintain the pH in the range of from about 7 to about 8.5. The bis(N,N-dibutylthiocarbamyl) disulfide, which forms and precipitates during the course of the reaction, is recovered by filtration of the vessel contents.

We claim as our invention:

1. A process for the prepartion of a thiuramdisulfide which comprises reacting a secondary amine selected from the group consisting of dialkyl, diphenyl and alkylphenyl amines and carbon disulfide and forming said thiuramdisulfide in the presence of an oxidizing agent selected from the group consisting of oxygen and air and a Group VIII metal phthalocyanine catalyst at a pH of about 7 to about 12 and a temperature of from about 5° C. to about 200° C.

2. A process for the preparation of a tetraalkylthiuramdisulfide which comprises reacting a dialkyl amine and carbon disulfide and forming said tetraalkylthiuramdisulfide in the presence of an oxidizing agent selected from the group consisting of oxygen and air and a Group VIII metal phthalocyanine catalyst at a pH of from about 7 to about 12 and a temperature of from about 5° C. to about 200° C.

3. A process for the preparation of a tetraalkylthiuramdisulfide which comprises reacting a dialkylamine and carbon disulfide and forming said alkylthiuramdisulfide in the presence of an oxidizing agent selected from the group consisting of oxygen and air and a cobalt phthalocyanine catalyst in an aqueous medium at a pH of from about 7 to about 12 and a temperature of from about 5° C. to about 200° C.

4. A process for the preparation of bis (N,N-diethylthiocarbamyl) disulfide which comprises reacting diethylamine and carbon disulfide and forming said bis(N,N-diethylthiocarbamyl) disulfide in the presence of air and cobalt phthalocyanine disulfonate in an aqueous medium at a pH of from about 7 to about 8.5 and a temperature of from about 5° C. to about 200° C.

5. A process for the preparation of bis(N,N-dimethylthiocarbamyl) disulfide which comprises reaching dimethylamine and carbon disulfide and forming said bis-(N,N-dimethylthiocarbamyl) disulfide in the presence of air and a cobalt phthalocyanine disulfonate in an aqueous medium at a pH of from about 7 to about 8.5 and a temperature of from about 5° C. to about 200° C.

6. A process for the preparation of bis(N,N-diisopropylthiocarbamyl) disulfide which comprises reacting diisopropylamine and carbon disulfide and forming said bis-(N,N-diisopropylthiocarbamyl) disulfide in the presence of air and cobalt phthalocyanine disulfonate in an aqueous medium at a pH of from about 7 to about 8.5 and a temperature of from about 5° C. to about 200° C.

7. A process for the preparation of bis(N,N-dibutylthiocarbamyl) disulfide which comprises reacting dibutylamine and carbon disulfide and forming said bis(N,N-dibutylthiocarbamyl) disulfide in the presence of air and cobalt phthalocyanine disulfonate in an aqueous medium at a pH of from about 7 to about 8.5 and a temperature of from about 5° C. to about 200° C.

8. A process for the preparation of bis(N,N-diethylthiocarbamyl) disulfide which comprises reacting diethylamine and carbon disulfide and forming said bis(N,N-diethylthiocarbamyl) disulfide in the presence of air and iron phthalocyanine disulfonate in an aqueous medium at a pH of from about 7 to about 8.5 and a temperature of from about 5° C. to about 200° C.

References Cited in the file of this patent

UNITED STATES PATENTS

| | | |
|---|---|---|
| 2,528,186 | Stanley | Oct. 31, 1950 |
| 2,854,467 | Harmon et al. | Sept. 30, 1958 |

FOREIGN PATENTS

| | | |
|---|---|---|
| 801,387 | Great Britain | Sept. 10, 1958 |

OTHER REFERENCES

Cook: J. Chem. Soc. (London), volume of 1938, pp. 1768–1780.

Paquot: Comptes rend. volume 209, pp. 171–173 (1939).